June 10, 1969 R. W. WHITMER 3,449,558
VEHICLE SAFETY LIGHTING DEVICE
Filed April 15, 1966
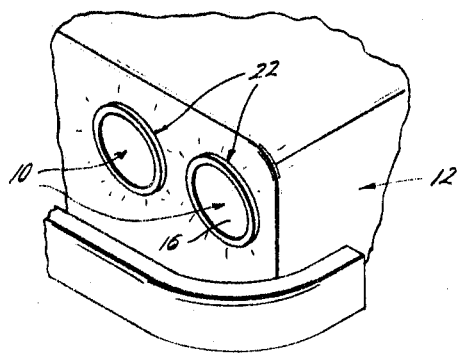
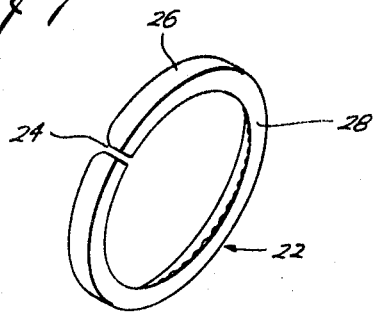
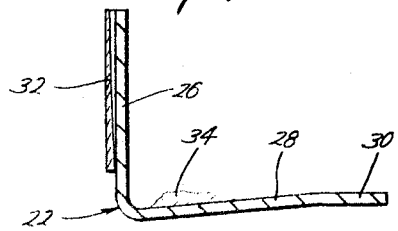
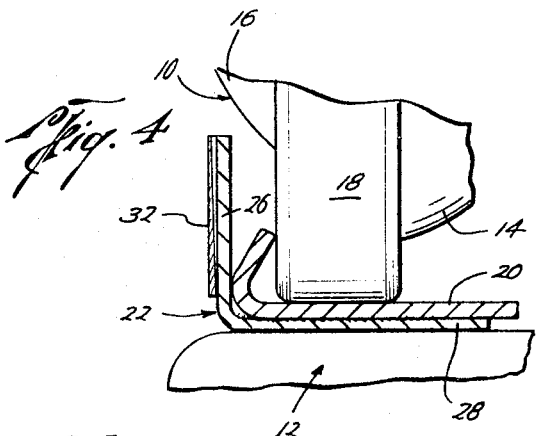
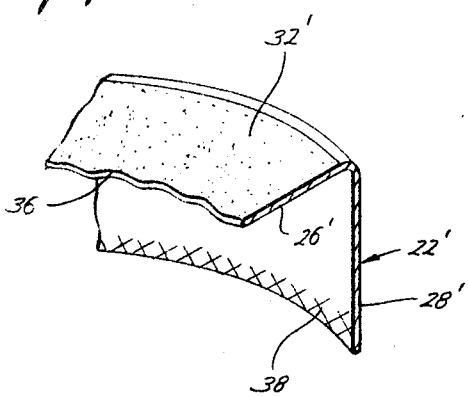
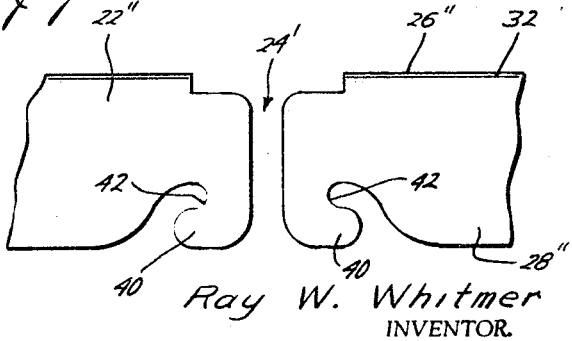
Ray W. Whitmer
INVENTOR.
BY Charles E. Lightfoot
ATTORNEY United States Patent Office 3,449,558
Patented June 10, 1969

3,449,558
VEHICLE SAFETY LIGHTING DEVICE
Ray W. Whitmer, 5002 Willowbend,
Houston, Tex. 77035
Filed Apr. 15, 1966, Ser. No. 542,795
Int. Cl. F21v 9/16
U.S. Cl. 240—2.25                                    2 Claims

ABSTRACT OF THE DISCLOSURE

A safety illumination device for vehicle headlights in the form of a ring-like member adapted to be positioned about a vehicle headlight and having an annular face upon which a luminous material is disposed in position to be illuminated by light from an approaching vehicle. The member is formed with an annular flange having a roughened face positioned for engagement with the headlight and a radial flange extending peripherally about the annular flange and formed with corrugations extending radially from the free edge of the radial flange. The luminous material is disposed on the outer face of the radial flange in position to be illuminated by light from an approaching vehicle. The member is cut through radially to allow peripheral expansion and contraction of the member and the annular flange is formed with adjacent end portions shaped for interengagement to connect the end portions together to hold the member on the headlight.

---

This invention relates to vehicle lights, such as the headlights or other lights of motor vehicles, and more particularly to a safety device for use with such lights which serves as a visual warning to oncoming vehicles in the event of the failure of the vehicle lights.

In the operation of motor vehicles at night it is important from the standpoint of safety to maintain the lights of the vehicle at maximum efficiency. The failure of one of a pair of headlights of a vehicle is a common occurrence of which the driver of the vehicle is often unaware and which presents the danger that the position of the vehicle on the road is not readily apparent to the driver of an approaching vehicle.

The present invention has for an important object the provision of a safety lighting device for motor vehicles embodying means associated with the vehicle headlights and rendered luminous by the light from an approaching vehicle.

Another object of the invention is the provision of safety lighting means adapted for application to the headlights of a motor vehicle and which is constructed to present the appearance of lighted headlights to the driver of an approaching vehicle when illuminated by light from the oncoming vehicle.

A further object of the invention is to provide a safety lighting device for motor vehicles which is easily applied to an automobile headlight, which does not interfere with the headlight when the same is in operation and which gives the effect of a lighted headlight under the influence of the light from an approaching vehicle in the event of the failure of such headlight.

The above and other important objects and advantages of the invention will be apparent from the following detailed description of a preferred embodiment of the same, when considered in conjunction with the annexed drawings, wherein FIGURE 1 is a fragmentary, perspective view, on a reduced scale, of a portion of the front end of a motor vehicle showing headlights of the same with the lighting device of the invention applied thereto;

FIGURE 2 is a perspective view illustrating the lighting device of the invention in its unattached condition;

FIGURE 3 is a cross-sectional view on a somewhat enlagred scale of the safety lighting device as illustrated in FIGURE 2;

FIGURE 4 is a fragmentary cross-sectional view similar to that of FIGURE 3, showing the lighting device attached to the headlight of a vehicle;

FIGURE 5 is a fragmentary, perspective view, partly in cross-section, of a portion of a somewhat modified form of the invention; and FIGURE 6 is a fragmentary plan view of a further modification of the invention showing end portions of the same in a disconnected condition.

Referring now to the drawings in greater detail, the invention is illustrated herein in connection with its application to a motor vehicle, such as an automobile of a usual type, having headlights, such as those shown generally at 10, which are set in suitable recesses in the vehicle body, generally designated 12. It will, of course, be understood that the invention is capable of application at other locations, such as on the tail lights or other lights of motor vehicles, and with other types of vehicles than automobiles.

In vehicles of the type illustrated herein, the headlights are of unitary construction, including a hollow casing of housing 14, having a lens 16 located to direct the light forwardly from the vehicle to light the roadway in front, such lens having an external annular rim portion 18, as shown in FIGURE 4, which is surrounded by an outer annular ring or rim 20. The headlights, as thus provided are inserted in suitable recesses in the body 12 which are of somewhat larger diameter than the external diameter of the ring 20 and are retained in a more or less centralized position in the recesses by suitable fastenings, not shown, of a usual type. By this arrangement an annular clearance space surrounds each of the headlights into which the device of the present invention is adapted to be inserted.

The lighting device of the invention takes the form of a ring-like member generally designated 22, which is cut through radially as shown at 24 in FIGURE 2, to render the member somewhat expansible, and which is of angular shape in cross-section to provide annular flanges 26 and 28. The angle between the flanges 26 and 28 may be slightly less than a right angle when the member is detached, as best shown in FIGURE 3, and the flange 28 may have a free edge portion 30 which is disposed in substantially right angular relation to the flange 26.

The flange 26 is provided on its outer face with a coating 32 of luminescent material, capable of glowing or fluorescing when exposed to the light from an approaching vehicle. This coating may take the form of sheet plastic material possessing the luminescent character referred to, which is suitably adhered to the external surface of the flange, or of a suitable coating material, such as luminous paint.

The member 22 may be formed of any suitable material, such as molded sheet plastic, sheet metal, or the like, having the requisite physical properties for the purpose.

The device thus constructed is applied to the vehicle by inserting the flange 28 between the ring 20 of the headlight 10 and the surrounding internal surface of the body 12 in the headlight recess, as shown in FIGURE 4.

The clearance space between the headlight and the surrounding surface of the vehicle body in the headlight recess is ordinarily quite narrow, so that in most instances the flange 28, when formed of relatively thin metal will fit tightly into place without the necessity of providing any additional fastening means. Due to the gap 24 provided in the member 22, the member may be expanded or contracted somewhat to allow the member to be tightly fitted on the headlight even under conditions in which the headlight may be in a somewhat off center position in the headlight recess.

When the member 22 is inserted in place the flange 28 may be forced into a position at right angles to the flange 26 at locations where the flange 28 fits tightly between the ring 20 and the surrounding internal surface of the headlight recess, as seen in FIGURE 4.

If desired the member 22 may be cemented or adhered to the headlight at suitable locations about the interior of the flange 28, as by means of an adhesive, such as that shown at 34 in FIGURE 3.

With the lighting device thus positioned on the headlight, it will be apparent that the device presents an annular face surrounding the lens 16 which will be brightly lighted by the light from an oncoming vehicle in the event that the headlight should fail to light, so that the driver of the on-coming vehicle will be warned that he is approaching another vehicle and may see the position of the same on the highway. It will also be seen that the member 22 may be constructed and attached in a manner to lie entirely outside of the area of the headlight through which illumination takes place, so that there will be no interference with the efficiency of the headlight in its normal use.

A somewhat modified form of the invention is illustrated in FIGURE 5, wherein the ring-like member 22' has the flange 26' thereof provided with a corrugated or wavy free marginal portion 36 against which the coating material 32' is pressed. The corrugating of the portion 36 may be accomplished when the coating 36 is applied as a thin sheet plastic material to assure the smooth and uniform application of the material and to improve the adherence of the same. The flange 28' may be roughened or knurled surface such as that shown at 38, as may also the flange 28 of the form of the invention illustrated in FIGURES 3 and 4, whereby a better frictional fit may be obtained between the member and the headlight.

A further modification of the invention is shown in FIGURE 6, wherein the member 22" is formed at the ends of the flange 28" thereof with hook shaped portions 40 and notches 42 whereby the ends of the flange may be connected together to hold the member in surrounding engagement with the headlight when the member is positioned thereon. In other respects the device as shown in FIGURE 6 is substantially the same as those previously described, and functions in the same manner.

It will thus be seen that the invention provides a safety lighting device which is of simple design and rugged construction and which is easily applied to headlights to be illuminated by the light from an approaching vehicle whereby the character and position of a vehicle may be discerned in the event of failure of its headlights.

The invention is disclosed herein in connection with particular embodiments of the same which are intended by way of illustration only, it being apparent that various changes can be made in the construction of the device within the spirit of the invention and the scope of the appended claims.

Having thus clearly shown and described the invention, what is claimed as new and desired to secure by Letters Patent, is:

1. A safety illumination device for a motor vehicle having a headlight comprising a member of annular shape adapted to be attached to the vehicle in surrounding relation to the headlight, said member being of angular shape in cross-section to provide an annluar flange to be positioned in surrounding relation to said headlight and a radially extending flange disposed about the periphery of said annuar flange, said member being cut through radially to allow peripheral expansion and contraction of the member, said annular flange being formed with adjacent end portions thereon shaped for interengagement to connect the end portions together, said radial flange being formed with corrugations extending radially from its free edge and said annular flange being formed with a roughened surface positioned for engagement with said headlight, and a luminous material on one face of said radial flange positioned to be illuminated by light from an approaching vehicle.

2. The illumination device of claim 1 wherein said flanges are disposed at an angle between them less than a right angle.

References Cited

UNITED STATES PATENTS

| 1,847,134 | 3/1932 | Nikonow | 240—8.3 |
| 2,004,098 | 6/1935 | Andrews | 24—17 |
| 2,093,907 | 9/1937 | Clark | 350—101 |
| 2,476,109 | 7/1949 | Neitzel | 240—46.59 |
| 3,223,834 | 12/1965 | Lorio | 240—46.57 |

FOREIGN PATENTS 502,943   5/1951   Belgium.

NORTON ANSHER, Primary Examiner.

D. B. WEBSTER, Assistant Examiner.

U.S Cl. X.R.

240—7.1